(12) United States Patent
Rosenberg et al.

(10) Patent No.: US 8,343,446 B2
(45) Date of Patent: Jan. 1, 2013

(54) OXINE MODIFIED SILICAN POLYAMINE COMPOSITES FOR THE SEPARATION OF GALLIUM FROM ALUMINUM, FERRIC FROM NICKEL AND COPPER FROM NICKEL

(75) Inventors: Edward Rosenberg, Missoula, MT (US); Paul Miranda, Butte, MT (US); Yuen Onn Wong, West Columbia, SC (US)

(73) Assignee: The University of Montana, Missoula, MT (US)

( * ) Notice: Subject to any disclaimer, the term of this patent is extended or adjusted under 35 U.S.C. 154(b) by 0 days.

(21) Appl. No.: 13/272,662

(22) Filed: Oct. 13, 2011

(65) Prior Publication Data

US 2012/0128556 A1    May 24, 2012

Related U.S. Application Data (60) Provisional application No. 61/392,621, filed on Oct. 13, 2010.

(51) Int. Cl.
*C02F 1/00* (2006.01)

(52) U.S. Cl. ......... 423/1; 423/6; 423/7; 423/24; 423/25; 423/49; 423/54; 423/63; 423/70; 423/87; 423/89; 423/100; 423/112; 423/139; 423/157; 423/510; 210/660; 210/679; 210/681; 210/682; 210/687; 210/688; 252/184; 502/405; 502/407; 75/710

(58) Field of Classification Search ............... 423/1, 6, 423/7, 24, 25, 49, 54, 63, 70, 87, 89, 100, 423/112, 139, 157, 510; 252/184; 210/660–688; 502/405, 407

See application file for complete search history.

(56) References Cited

U.S. PATENT DOCUMENTS

| | | | | |
|---|---|---|---|---|
| 3,886,080 A | * | 5/1975 | Schucker et al. | 252/176 |
| 4,421,654 A | * | 12/1983 | Plueddemann | 210/698 |
| 4,448,694 A | * | 5/1984 | Plueddemann | 210/682 |

* cited by examiner

*Primary Examiner* — Steven Bos
(74) *Attorney, Agent, or Firm* — Jean Kyle (57) ABSTRACT

The oxine ligands 5-chloro-8-hydroxyquiniline and 5-sulfoxyl-8-hydroxyquinoline are covalently bound, using, for example, the Mannich reaction, to a silica gel polyamine composite made from a silanized amorphous silica xerogel and polyallylamine. The resulting modified composites, termed CB-1 (X=Cl) and SB-1 (X=$SO_3H$), respectively, show a clear selectivity for trivalent over divalent ions and selectivity for gallium over aluminum. The compounds of the invention can be applied for the sequestration of metals, such as heavy metals, from contaminated mine tailing leachates.

18 Claims, 11 Drawing Sheets

FIG. 3A $M = Cu^{2+}, Fe^{3+}, Al^{3+}, Ga^{3+}, Ni^{2+}$ $L = H_2O$ or anion

OXINE MODIFIED SILICAN POLYAMINE COMPOSITES FOR THE SEPARATION OF GALLIUM FROM ALUMINUM, FERRIC FROM NICKEL AND COPPER FROM NICKEL

CROSS-REFERENCE TO RELATED APPLICATIONS

This application claims the benefit of U.S. Provisional Application No. 61/392,621, filed Oct. 13, 2010, the disclosure of which is hereby incorporated by reference in its entirety including all figures, tables and drawings.

STATEMENT REGARDING FEDERALLY SPONSORED RESEARCH OR DEVELOPMENT

The subject invention was made with government support under Grant No. CHE 0709738 awarded by the National Science Foundation. The government has certain rights in the invention.

REFERENCE TO SEQUENCE LISTING, A TABLE, OR COMPUTER PROGRAM LISTING COMPACT DISC APPENDIX

Not Applicable.

BACKGROUND OF THE INVENTION

Figure 1:
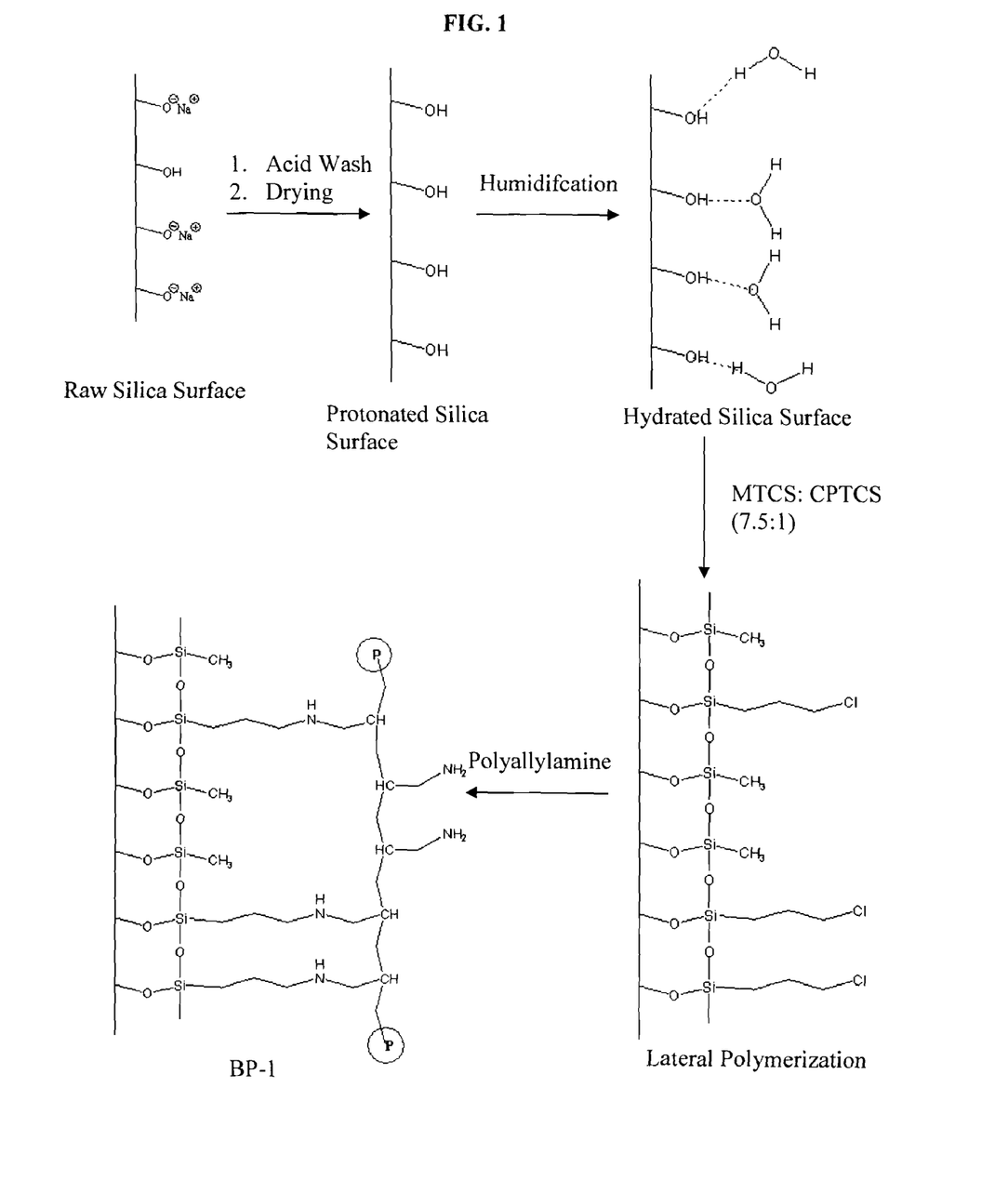
FIG. 1 shows the scheme for synthesis of the silica polyamine composite BP-1.
Figure 2:
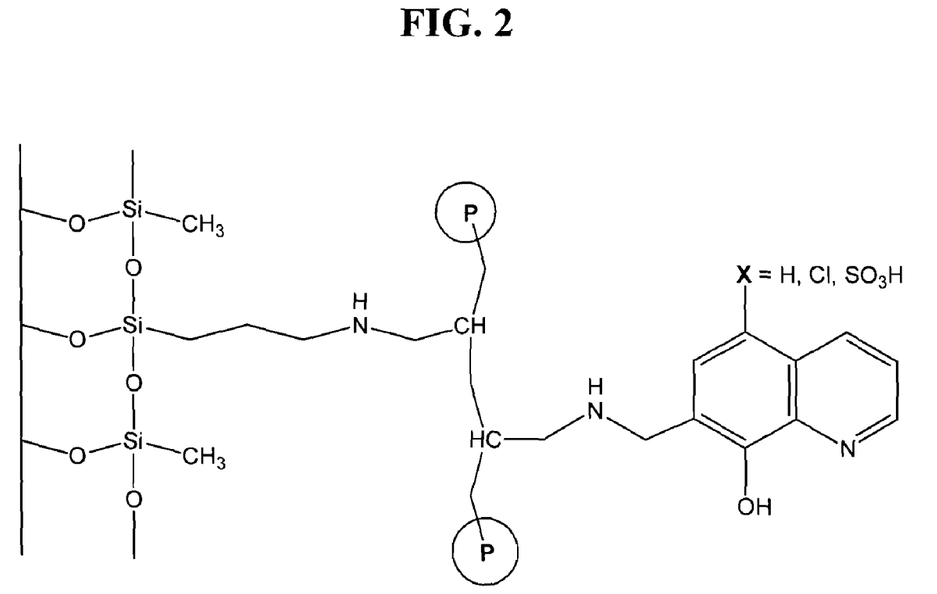
FIG. 2 is a schematic of the covalent binding of 8-hydroxyquinoline to BP-1 (WP-4).

The consequences of increasing metal concentrations in surface and subsurface aqueous environments as a result of mining are not easy to anticipate due to the broad range of biogeochemical conditions and biological pathways in organisms (Allan, "Introduction: Mining and Metals in the Environment," *J. Geochem. Explor.* 58:95 (1997)). To address this environmental problem, silica polyamine composites (SPCs) have been developed as one among many remediation technologies including organic polymer chelator resins and surface silanized silica gels (Zagorodni, "Ion Exchange Materials: Properties and Applications," Elsevier Ltd. (2007); Beauvais et al., "Polymer-Supported Reagents for the Selective Complexation of Metal Ions: an Overview," *Reactive & Functional Polymers* 36:113 (1998); Shiraishi et al., "Separation of Transition Metals Using Inorganic Adsorbents Modified with Chelating Ligands," *Ind. Eng. Chem. Res.* 41(20):5065 (2002)). The SPCs combine the better capture kinetics and matrix rigidity of the surface modified silica gels with higher loading capacities of the polymer based chelator resins. SPCs are composed of a silica gel support covalently bonded to linear or branched water soluble chelating polyamines (Hughes et al., "Silica Polyamine Composites: New Supramolecular Materials for Cation and Anion Recovery and Remediation," *Macromol. Symp.* 235:161 (2006); Beatty et al., "A Comparative Study of the Removal of Heavy Metal Ions from Water Using a Silica-Polyamine Composite and a Polystyrene Chelator Resin," *Ind. Eng. Chem. Res.* 38:4402 (1999); Hughes et al., "Structural Investigations of Silica Polyamine Composites: Surface Coverage, Metal Ion Coordination, and Ligand Modification," *Ind. Eng. Chem. Res.* 45:6538 (2006); Hughes et al., "Polymer Structure and Metal Ion Selectivity in Silica Polyamine Composites Modified with Sodium Chloroacetate and Nitriloacetic Acid (NTA) Anhydride," *Ind. Eng. Chem. Res.* 47:6765 (2008); Rosenberg et al., "Removal of Low Level Mercury from Aqueous Streams Using Silica Polyamine Composites," EPD Congress 2003 as held at the 2003 TMS Annual Meeting (San Diego, Calif.; 2-6 Mar. 2003). p. 285; Kailasam et al., "Characterization of Surface-Bound Zr(IV) and Its Application to Removal of As(V) and As(III) from Aqueous Systems Using Phosphonic Acid Modified Nanoporous Silica Polyamine Composites," *Ind. Eng. Chem. Res.* 48:3991 (2009); Nielsen et al., "High-flow Metal Recovery from Acid Mine Drainage Utilizing Modified Silica Polyamine Composite Technology," *Chimica Oggi* 26:42 (2008); and Allen et al., "Surface Oxidation of $CO^{2+}$ and its Dependence on Ligand Coordination Number in Silica Polyamine Composites," *Inorg. Chim. Acta* 363:617 (2010). The SPCs are synthesized via the following steps: acid washing of the silica gel surface, humidification, silanization with a mixture of methyltrichlorosilane (MTCS) and chloropropyltrichlorosilane (CPTCS), and finally addition of a polyamine and a modifying ligand (FIG. 1; Hughes et al., *Macromol. Symp.* 235:161 (2006)). SPCs show no shrinking or swelling, they withstand operating temperatures of up to 110° C., have anticipated stability to radiolytic decomposition, and they exhibit long usable lifetimes due to their rigid macrostructure and the multipoint anchoring of the polymer (Beatty et al., *Ind. Eng. Chem. Res.* 38:4402 (1999)). Prior studies on SPCs revealed that usage of MTCS and CPTCS in a 7.5:1 ratio on modified silica gel gave improvements in metal ion capacities and mass transfer kinetics under low-pH aqueous extraction conditions (Hughes et al., *Ind. Eng. Chem. Res.* 45:6538 (2006)). The improved metal selectivity capacity for a particular metal atom is thought to be caused by the greater availability of coordinating sites.

The oxine ligand (i.e., 8-hydroxyquinoline) has long been known to be a versatile functional group for complexing transition metal ions and in particular trivalent ions. The solvent extraction lixavent, Kelex 100, is an alkyl-modified oxine that has found extensive use in solvent extraction, particularly for the recovery of gallium from Bayer solutions produced in the aluminum refining industry (Matsuda et al., *Nippon Kagaku Kaishi* 415 (1990)). Several groups have reported the impregnation of Kelex 100 into polystyrene resins (Nakayama et al., "Recovery of Gallium(III) from Strongly Alkaline Media Using a Kelex-100-Loaded Ion-Exchange Resing," *Ind. Eng. Chem. Res.* 36:4365 (1997)). Covalent binding of the oxine ligand to water soluble polymers (Rongnong et al., *Naturforsch* 47b:1300 (1992)), as well as polystyrene resins via azo linkages (Davies et al., "Syntheses of Metal Complexing Polymers. IV. Polymers Containing Miscellaneous Functional Groups," *Appl. Chem.* 9:368 (1959)), Friedel-Krafts chemistry (Sugii et al., "Preparation and Properties of Chelating Resins Containing 8-Hydroxyquinoline," *Chem. Pharm. Bull.* 26(3):798 (1978)) or copolymerization with resorcinol (Vernone et al., "Chelating Ion-Exchangers Containing 8-Hydroxyquinoline as the Functional Group," *Anal. Chim. Acta* 63:403 (1973)) has been reported. Covalent bonding to aminopropyl functionalized silica gels via the diazotization method (Fulcher et al., "Synthetic Aspects of the Characterization of Some Silica-Bound Complexing Agents," *Anal. Chim. Acta* 129:29 (1981)) and the Mannich reaction (Pyell et al., "Preparation and Properties of an 8-Hydroxyquinoline Silica Gel, Synthesized via Mannich Reaction," *Anal. Chem.* 342:281 (1992)) also been reported. Although some of these materials showed promise for sequestering metal ions in general they had significant problems with mass transfer kinetics (organic polymers) or low capacities (silica gels). Furthermore, the selectivity of these oxine modified solid phase adsorbents for various metals was not well defined in the prior work.

All patents, patent applications, provisional patent applications and publications referred to or cited herein, are incorporated by reference in their entirety to the extent they are not inconsistent with the teachings of the specification.

BRIEF SUMMARY OF THE INVENTION

In one aspect of the invention, a metal sequestration compound composed of a silica polyamine composite covalently bound to 5-chloro-8-hydroxyquinoline or 5-sulfonyl-8-hydroxyquinoline is presented. In one embodiment, the silica polyamine composite is a silica gel in combination with a polyamine such as polyallylamine, polyvinylamine, and polyethylene-imine. In another embodiment, the polyamine is polyallylamine.

In a second aspect of the invention, a method of manufacturing a metal sequestration compound by treating a silica gel with acid washing, humidification, and silanization with a mixture of methyltrichlorosilane and chloropropyltrichlorosilane, contacting the silica gel with a polyamine to yield a silica polyamine composite, and joining the silica polyamine composite with 5-chloro-8-hydroxyquinoline or 5-sulfonyl-8-hydroxyquinoline is presented. In one embodiment, the polyamine is polyallylamine, polyvinylamine, or polyethylene-imine. In another embodiment, the polyamine is polyallylamine. In a further embodiment, the silica polyamine composite is joined to 5-chloro-8-hydroxyquinoline or 5-sulfonyl-8-hydroxyquinoline via the Mannich reaction. In yet another embodiment, the silica polyamine composite is joined to 5-chloro-8-hydroxyquinoline or 5-sulfonyl-8-hydroxyquinoline by a covalent bond.

In a third aspect of the invention, a method of sequestering a metal from an aqueous solution by contacting an aqueous solution containing at least one metal with a metal sequestration compound composed of a silica polyamine composite covalently bound to 5-chloro-8-hydroxyquinoline or 5-sulfonyl-8-hydroxyquinoline, and recovering the metal sequestration compound from the aqueous solution is presented. In one embodiment, the silica polyamine composite is a silica gel in combination with a polyamine such as polyallylamine, polyvinylamine, and polyethylene-imine. In another embodiment, the aqueous solution is a mine tailing leachate. In a further embodiment, the sequestered metal is aluminum, arsenic, cadmium, chromium, cobalt, copper, gallium, germanium, iron, lead, manganese, magnesium, mercury, molybdenum, nickel, plutonium, selenium, thallium, thorium, tin, tungsten, uranium, vanadium, zinc, or zirconium.

In a fourth aspect of the invention, a method of separating two distinct metals present in an aqueous solution containing two non-identical metals by contacting the aqueous solution with a metal sequestration compound composed of a silica polyamine composite covalently bound to 5-chloro-8-hydroxyquinoline or 5-sulfonyl-8-hydroxyquinoline and recovering the metal sequestration compound from the aqueous solution is presented. In one embodiment, the silica polyamine composite is a silica gel in combination with a polyamine such as polyallylamine, polyvinylamine, and polyethylene-imine. In another embodiment, the aqueous solution contains at least two of the following metals: aluminum, arsenic, cadmium, chromium, cobalt, copper, gallium, germanium, iron, lead, manganese, magnesium, mercury, molybdenum, nickel, plutonium, selenium, thallium, thorium, tin, tungsten, uranium, vanadium, zinc, and zirconium. In a further embodiment, the aqueous solution contains gallium and aluminum. In yet another embodiment, the aqueous solution contains iron and nickel. In another embodiment, the aqueous solution contains copper and nickel.

By "polyamine" is meant an organic compound having two or more primary amino groups ($-NH_2$). Polyamines include, e.g., polyallylamine, polyvinylamine, and polyethylene-imine. A silica polyamine composite that incorporates polyallylamine is referred to as "BP-1".

By "oxine" or "oxines" is meant 8-hydroxyquinoline or derivatives of 8-hydroxyquinoline, including, e.g., 5-chloro-8-hydroxyquinoline and 5-sulfoxyl-8-hydroxyquinoline.

By "silica gel" is meant a granular, vitreous, porous form of silica made synthetically from sodium silicate. Silica gels may occur in either granular or beaded form. Silica Gel Support. Depending on the method of production, the silica gel particles can have irregular or spherical shape. The silica used for SPC production have included amorphous gels which have had particle sizes ranging from 30 µm-1000 µm, average pore diameters of 8 nm-30 nm, pore volumes of 0.8 mL-1.5 mL/g and surface areas of 250 m2/g-400 m2/g. For IX materials, particle size causes a trade off between mass transfer kinetics and backpressure during column operations. Decreased particle size promotes improved mass transfer kinetics which allows increased flow rates during column processes. However, a consequence of smaller particles is greater pressure drops across the column. Large pressure drops across the column can cause problems when IX resins are employed commercially. Increased particle size has been shown to reduce the metal ion uptake capacity per gram of material as a result of increases in the interstitial space between particles. A SPC material prepared from raw amorphous silica in the range of 150 µm to 250 µm diameter has been found to be a reasonable compromise. In contrast, polymeric IX resins are typically in range 250 µm to 800 µm for diameter. Typical flow rates for SPC column operations are in the range 0.1 CV/min (column volume per minute) to 1.0 CV/min. In contrast polymeric IX resins often require flow rates <0.2 CV/min.

By "silica polyamine composite" is meant the combination of a silica gel and a polyamine.

DETAILED DESCRIPTION OF THE INVENTION

The present invention features polyamine composites functionalized with specific oxine derivatives that are useful for the sequestration of metals, such as heavy metals (e.g., aluminum, arsenic, cadmium, chromium, cobalt, copper, gallium, germanium, iron, lead, manganese, magnesium, mercury, molybdenum, nickel, plutonium, selenium, thallium, thorium, tin, tungsten, uranium, vanadium, zinc, and zirconium), from aqueous solutions, such as leachate derived from mines, mine tailings, or other environments contaminated with metals. The invention further features processes of manufacturing the oxine derivative-functionalized polyamine composites as well as methods for using such composites to sequester metals from contaminated aqueous solutions.

Oxine Derivative-Functionalized Silica Polyamine Composites

The two functionalized silica polyamine composites ("SPC") of the invention, "CB-1", containing the 5-chloro-8-hydroxyquinoline functional group, and "SB-1", containing the 5-sulfonyl-8-hydroxyquinoline functional group, were synthesized by a two-step Mannich reaction modified from that used to produce aminopropyl silanized silica gel (Pyell et al., *Anal. Chem.* 342:281 (1992)). The physical, chemical, and metal-binding properties of CB-1 and SB-1 were compared composites were compared to a SPC functionalized with 8-hydroxyquinoline (i.e., "WP-4").

Solid state NMR data are consistent with the proposed composite formulations of SB-1 and CB-1. Both composites show the expected aromatic resonances in the range of 128-143 ppm as well as the aliphatic resonances associated with the PAA and the silane anchors. The methyl resonance for the methyl silanized sites is observed at −6.0 ppm for all three composites. The solid state NMR cannot specify the position of attachment of the polymer to the quinoline ring but prior work on related systems using the same synthetic pathway specified the 7 position.[20] Elemental analyses of SB-1 and CB-1 show higher carbon and nitrogen content in all the composites. The higher carbon and nitrogen content indicates successful modification of amines with 5-chloro-8-hydroxyquinoline and 5-sulfonyl-8-hydroxyquinoline ligands. Based on the chlorine and sulfur analyses, CB-1 has a ligand loading of 0.54 mmol/g and SB-1 has a ligand loading of 0.90 mmol/g (Table 1, the percentage composition data converted to mmol/g).

TABLE 1

Elemental analysis data and ligand loading for BP-1, SB-1 and CB-1. Error in elemental analysis is ±0.3%.

| | C (mmol/g) | H (mmol/g) | N (mmol/g) | Cl (mmol/g) | S (mmol/g) |
|---|---|---|---|---|---|
| BP-1 | 9.92 | 24.31 | 1.73 | 0.18 | — |
| SB-1 | 12.89 | 21.92 | 1.80 | — | 0.90 |
| CB-1 | 14.58 | 22.22 | 2.03 | 0.72 | — |

A different sample of BP-1, made from a different commercial silica gel, was used to prepare WP-4 and the ligand loading can be estimated by calculating the difference in nitrogen content, before and after reaction, taking into account the observed mass gain, gave a value of 0.54 mmol/g (Table 2).

TABLE 2

Elemental analysis data and ligand loading for BP-1 and WP-4. Error in elemental analysis is ±0.3%.

| | C (mmol/g) | H (mmol/g) | N (mmol/g) |
|---|---|---|---|
| BP-1 | 10.76 | 29.96 | 2.62 |
| WP-4 | 21.06 | 30.36 | 3.12 |

Sequestration of Metals Using Compounds of the Invention

The compounds of the invention are useful for the sequestration of metals (e.g., heavy metals) from aqueous solutions, such as leachate found draining a mining operation, mining tailings, or any other environment in which the concentration of one or more metals is known to be elevated. Heavy metal contamination of, e.g., drinking water, can subject humans, animals, and other organisms to significant morbidity. The compounds of the invention can be used to sequester and recover metals, such as heavy metals (e.g., aluminum, arsenic, cadmium, chromium, cobalt, copper, gallium, iron, lead, manganese, mercury, molybdenum, nickel, plutonium, selenium, thallium, thorium, tin, tungsten, uranium, vanadium, zinc, and zirconium), thereby rendering the treated leachate or environment suitable for human use or consumption.

The following examples are offered to further illustrate but not limit both the compositions and the methods of the present invention.

EXAMPLE 1

General

Silica gel (267 Å average pore diameter, 2.82 mL/g pore volume, 84.7% porosity, 422 m$^2$/g surface area) was obtained from INEOS Enterprises Ltd., UK, or Qing Dao-Meigao, China, and sieved to 150-250 microns. All chemicals were reagent grade and purchased from Sigma-Aldrich Co. and EMD Chemicals Inc. Stock solutions of Al(III), Ga(III), Fe(III), Ni(II), Cu(II), Ca(II), Mg(II) and Mn(II) were prepared using aluminum sulfate hydrate ($Al_2(SO_4)_3.xH_2O$), gallium nitrate hydrate ($Ga(NO_3)_3.xH_2O$), ferric sulfate hydrate ($Fe_2(SO_4)_3.AH_2O$), nickel sulfate hexahydrate ($NiSO_4.6H_2O$), cupric sulfate pentahydrate ($CuSO_4.5H_2O$), calcium sulfate dehydrate ($CaSO_4.2H_2O$), anhydrous magnesium sulfate ($MgSO_4$) and manganese sulfate monohydrate ($MnSO_4.H_2O$) respectively. Solution pH was adjusted from the intrinsic pH, where necessary, using sulfuric acid and sodium hydroxide. Metal Standards for AA analysis were obtained from Sigma-Aldrich and Fisher Scientific Co.

Infrared characterization of modified composites was carried out with a Thermo Nicolet Nexus 670 FT-IR spectrophotometer as KBr pellets. Solid state $^{13}C$ CPMAS spectra were obtained on a Varian NMR Systems 500 MHz spectrometer at 125 MHz with a spinning speed of 15 KHz. $^{13}C$ chemical shifts are reported relative to external tetramethyl silane. Elemental analyses (carbon, hydrogen, nitrogen, chloride, sulfur) were conducted by Schwarzkopf Micro-analytical Laboratory, Woodside, N.Y and Galbraith Laboratories Inc., Knoxville, Tenn.

Batch capacity experiments were conducted in 20 mL vials and agitated on a Precision Scientific 360 shaker bath (Precision Scientific, Inc., Chicago, Ill.). Dynamic experiments were conducted with a 15 cc borosilicate glass column (Omnifit®, Bio-Chem Valve Inc.). The column was then slurry packed and the challenge solution was fed by a variable-flow FMI Lab Pump model QG150 (Fluid Metering Inc., Syosset, N.Y.). Metal concentrations were determined via a Flame Atomic Absorption (FAA) method using a S2 FAA Spectrometer from SOLAAR. The samples that were above the calibration range of the FAA were diluted using a solution mixture of 2%/2%-$HNO_3$/KCl. A nitrous oxide/acetylene flame was used to analyze aluminum and gallium. The dilutions for FAA and AES were done in triplicate and standards were analyzed after every 10 samples. The standards for aluminum, gallium, iron, nickel, copper, calcium, magnesium and manganese were obtained from Fisher Scientific Co. Error bars are included where the error is deemed significant relative to the absolute measurement. The starting composite BP-1 was synthesized by previously published procedures (Hughes et al., *Macromol. Symp.* 235:161 (2006); Hughes et al., *Ind. Eng. Chem. Res.* 45:6538 (2006); and Hughes et al., *Ind. Eng. Chem. Res.* 47:6765 (2008)).

Characterization of the synthesized composites was achieved by elemental analysis, KBr infrared pellet and $^{13}C$ CPMAS solid state NMR. These data confirm the presence of the desired functional groups and allow an estimate of the degree of conversion from the starting amine functionalities.

EXAMPLE 2

Synthesis of 5-Chloro-8-Hydroxyquinoline (CB-1) and 5-Sulfonic acid-8-Hydroxyquinoline, (SB-1) via Mannich Reaction Ten g of BP-1 was mixed with a reagent solution of 50 mL aqueous formaldehyde (38.0%) and 1 mL glacial acetic acid (17.4 M) in a 250 mL flask. The suspension was stirred for 1 hour at room temperature and filtered. The composite was then washed with 100 mL of ethanol and filtered. The above procedure was repeated three times. Five g of 5-Chloro-8-Hydroxyquinoline (95%) or 5 g of 8-Hydroxyquinoline-5-Sulfonic acid (98%) and 200 mL of ethanol were added and stirred for 24 hours at 70° C. In addition, the solution was adjusted to pH 9 by adding tetramethyl ammonium hydroxide (25% wt. solution in methanol) dropwise. Upon completion of the above step, the composite was washed once with ethanol (pH 9), once with 1 M $NH_4OH$, three times with distilled water, three times with 2 M $H_2SO_4$, three times with distilled water, two times with acetone and dried at 70° C. The mass gain for CB-1 and SB-1 were 10.5% and 17.5% respectively.

Elemental Analyses:
BP-1: 11.91%; C, 2.45%; H, 2.42%; N, 0.64%; Cl
CB-1: 17.51%; C, 2.24%; H, 2.85%; N, 2.54%; Cl
SB-1: 15.48%; C, 2.21%; H, 2.52%; N, 2.90%; S IR spectra (KBr pellet) for CB-1: 3437 (m) (vN—H), 2960-2838 (m) (vC—H, aliphatic), 1733 (w) (aromatics), 1636 (m) (vN—C), 1458 (m) ($vSi—CH_2$), 1383 (m) ($vSi—CH_3$), 1108 (s) (vSi—O), 807 (m) (vN—H) $cm^{-1}$ $^{13}C$ NMR (CPMAS, δ) for CB-1: −6.35 ($Si—CH_3$), 7.82 ($Si—CH_2$), 16.37 ($CH_2$ aliphatic), 28.70 ($CH_2$ polyamine), 117.19-146.14 (aromatic)

IR spectra (KBr pellet) for SB-1: 3437 (m) (vN—H), 2960-2838 (m) (vC—H, aliphatic), 1733 (w) (aromatics), 1647 (m) (vN—C), 1457 (m) ($vSi—CH_2$), 1383 (m) ($vSi—CH_2$), 1108 (s) (vSi—O), 799 (m) (vN—H) $cm^{-1}$ $^{13}C$ NMR (CPMAS, δ) for SB-1: −6. ($Si—CH_3$), 8.27 ($Si—CH_2$), 17.23 ($CH_2$ aliphatic), 32.36 ($CH_2$ polyamine), 123.86-151.54 (aromatic)

EXAMPLE 3

Concentration Dependent Isotherms

Equilibrium batch tests were performed to evaluate the capacity of WP-4 for adsorption of iron (III) in the pH range of 0-2 based on the observed selectivity of the 8-hydroxy quinoline for trivalent over divalent ions (vide infra). Solutions (10 mL) containing 1.5 g/L of ferric iron were shaken with 0.1 g of the composite for 24 h. The batch capacities for ferric iron are shown in Table 2. As expected, maximum ferric iron capacity occurs at pH 2 while the minimum ferric iron capacity occurs at pH 0. Above pH=2 ferric precipitation becomes a problem. An interesting point to note is the adsorption of Fe (III) ions to the 8-hydroxyquinoline ligand of WP-4 (0.16 mmol/g) at pH 0. The phenol and quinoline nitrogen in 8-hydroxyquinoline have pKa values of 9.70 and 4.9 respectively (Phillips et al., "Ionization Constants of Some Substituted 8-Hydroxyquinolines," *Amer. Chem. Soc.* 70:410 (1948)) while the corresponding values for the immobilized oxine ligand on amino propyl silica gels are 9.2 and 2.9 (Lan et al., "Synthesis, Properties and Applications of Silica-Immobilized 8-Quinolinol: Part 2. On-Line Column Preconcentration of Copper, Nickel and Cadmium from Sea Water and Determination by Inductively-Coupled Plasma Atomic Emission Spectrometry," *Anal. Chim. Acta* 287:111 (1994)).

Therefore at pH 0, the phenol and quinoline nitrogen will be protonated. The significant adsorption of Fe (III) ions at pH 0 indicates that the 8-hydroxyquinoline ligand displays binding affinity for Fe (III) ions even under fairly acidic conditions.

TABLE 3

| Iron (III) batch capacities at various pH for WP-4 | |
|---|---|
| pH | Fe(III) Capacity—mg/g (mmol/g) |
| 0.0 | 9.06 (0.16) |
| 0.5 | 16.94 (0.30) |
| 1.0 | 21.86 (0.39) |
| 1.5 | 23.65 (0.42) |
| 2.0 | 25.91 (0.46) |

Previous reports on the metal adsorption properties of covalently immobilized oxine ligands focused primarily on the divalent transition metal ions. Therefore equilibrium batch tests were performed to evaluate the selectivity of WP-4, SB-1 and CB-1 for divalent versus trivalent cations. Solutions (10 mL) containing two different cations were shaken with 0.1 g of a composite for 24 hrs at pH 2. Solutions containing 2 g/L each of Cu (II) and Fe (III) were evaluated first. Cu (II) and Fe(III) ions co loaded on all the composites. WP-4, SB-1 and CB-1 loaded a total of 0.46, 0.44, 0.58 mmol of Cu (II) and Fe (III) ions per gram of composite respectively (Table 4). Selectivity factors for Fe (III) over Cu (II) were 2.8, 2.6, and 4.3 for WP-4, SB-1, CB-1 respectively.

TABLE 4

| Mixed metal batch tests, selectivity ratios and metal to ligand ratios WP-4, SB-1, CB-1. | | | | | | | |
|---|---|---|---|---|---|---|---|
| Func. SPC | Feed Solution | pH | Capacity-mg/g (mmol/g) | | Selectivity Factor | Metal to Ligand Ratio | |
| | | | Cu(II) | Fe(III) | | Cu(II) | Fe(III) |
| | 2 g/L of Cu(II) and Fe(III) | 2 | | | | | |

TABLE 4-continued

Mixed metal batch tests, selectivity ratios
and metal to ligand ratios WP-4, SB-1, CB-1.

| Func. SPC | Feed Solution | pH | Capacity-mg/g (mmol/g) | | Selectivity Factor | Metal to Ligand Ratio | |
|---|---|---|---|---|---|---|---|
| WP-4 | | | 7(0.12) | 19(0.34) | 2.8 | 0.22 | 0.62 |
| SB-1 | | | 8(0.13) | 17(0.31) | 2.4 | 0.14 | 0.34 |
| CB-1 | | | 7(0.11) | 26(0.47) | 4.3 | 0.20 | 0.87 |
| | 2 g/L of Al(III) and Ga(III) | 2.3 | Al(III) | Ga(III) | | Al(III) | Ga(III) |
| WP-4 | | | 1(0.05) | 30(0.43) | 8.6 | 0.10 | 0.79 |
| SB-1 | | | 6(0.21) | 26(0.37) | 1.8 | 0.23 | 0.41 |
| CB-1 | | | 4(0.14) | 23(0.33) | 2.3 | 0.26 | 0.61 |
| | 1 g/L of Ni(II) and Fe(III) | 2 | Ni(II) | Fe(III) | | Ni(II) | Fe(III) |
| WP-4 | | | 0.5(0.01) | 25(0.45) | 45 | 0.01 | 0.83 |
| SB-1 | | | 0.3(0.01) | 20(0.36) | 36 | 0.01 | 0.40 |
| CB-1 | | | 0.4(0.01) | 25(0.45) | 45 | 0.02 | 0.83 |

In another batch test with 2 g/L of Al(III) and Ga(III) at pH 2.3, selectivity of the composites toward chemically similar trivalent ions were determined. Analogous to the Cu(II) and Fe(III) batch, co loading of Al(III) and Ga(III) ions occurred. WP-4, SB-1 and CB-1 loaded a total of 0.89, 0.64, 0.87 mmol of Al(III) and Ga(III) ions per gram of composite respectively. Selectivity factors for Ga(III) over Al(III) ions for WP-4, SB-1 and CB-1 were 8.6, 1.8 and 2.3 respectively (Table 4). WP-4 showed a much higher selectivity for Ga(III) over Al(III) than the other two composites. The selectivity for Ga (III) over Al (III) displayed by WP-4 can be explained by larger ionic radius for Ga (III) (76 pm) than Al (III) ions (67.5 pm).

Figure 3A:
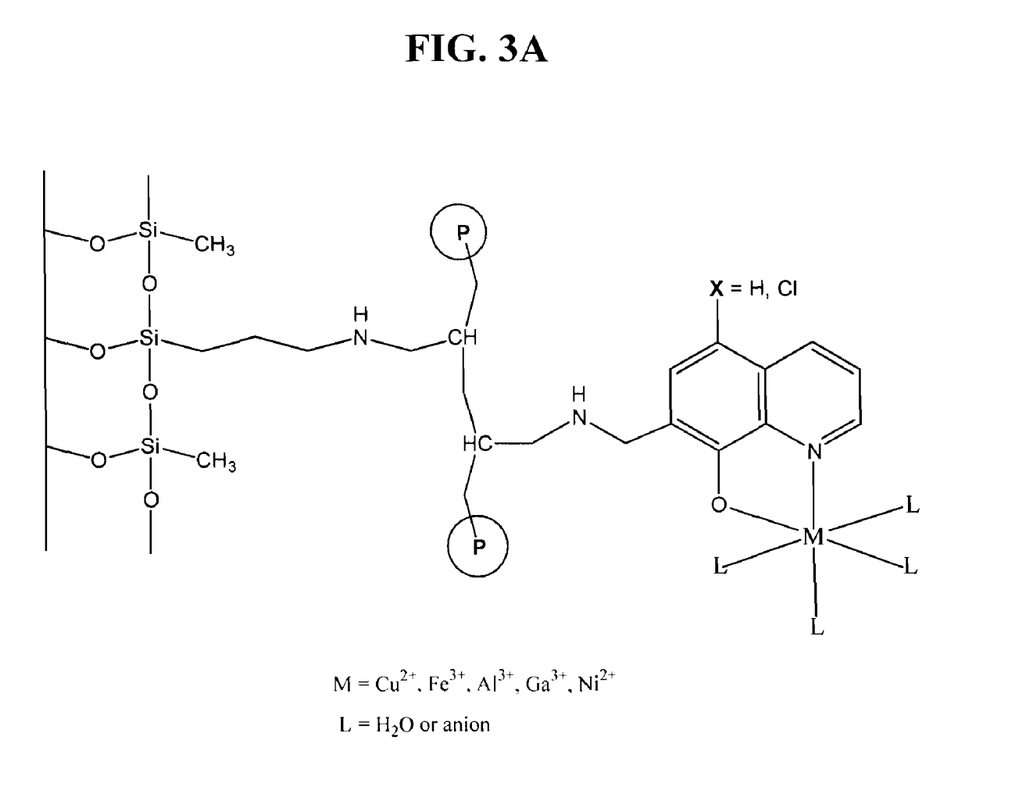
FIG. 3 shows the mode of metal coordination to a) WP-4 and CB-1; b) Mode of metal coordination in SB-1.
Figure 3B:
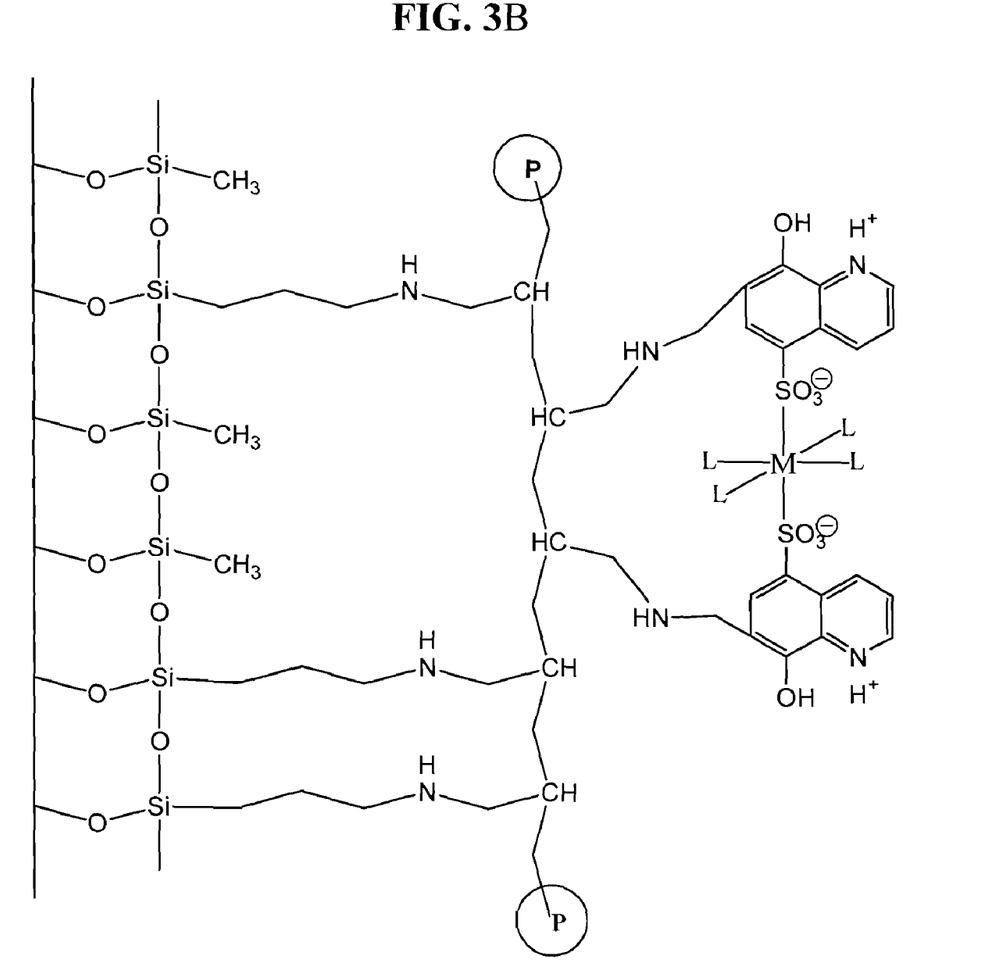

The last batch test was conducted at pH 2 consisting 1 g/L Ni (II) and Fe (III). All the composites were selective for Fe (III) over Ni (II) ions. WP-4, SB-1 and CB-1 displayed selectivity factors of 45, 36 and 45 for Fe (III) over Ni (II) ions respectively. The sum of Fe (III) and Ni (II) ions to ligand ratio for WP-4, SB-1 and CB-1 are 0.52, 0.41 and 0.85 respectively. As expected from the Irving-Williams series copper has a much stronger binding constant for most nitrogen containing ligands than nickel leading to the higher selectivity factors for the trivalent ferric ion.[22] Using the estimates of ligand loading obtained from elemental analyses and the total metal loadings for the three mixed solutions in Table 4 we are to get metal to ligand ratios in order to gain some insight into the coordination mode of the various metal ions tested. In the case of WP-1 and CB-1 the combined metal to ligand ratios are in the range 0.84 to 1.07 suggesting that each metal atom is bound to one ligand (Table 4). The metal ions would likely be in an octahedral environment with the oxine ligand occupying two cis-sites and the remaining coordination sites being taken up by water or the anions of present in the solution depending on the metal salt used in the batch experiments (FIG. 3a). One possible exception would be copper which likes to adopt a square planar structure and would have only two ligands trans- to the oxine nitrogen and oxygen. Most interestingly, the metal to ligand ratios for SB-1 are in the range of 0.41-0.64 suggesting that two oxine ligands are bound to each metal ion. Considering that the relative $pK_a$ values for the sulfonic acid group and the quinoline nitrogen are 1.6 and 4.9 respectively it seems reasonable to propose that at pH=2 the quinoline nitrogen would be fully protonated and the sulfonic acid group would be mostly in the anionic form. In the case of the neutral CB-1 and WP-4 the binding constants for the metals are competitive with N-protonation (in part due to the chelate effect). For SB-1 however, metal adsorption could take place via simple electrostatic interaction with two neighboring anionic sulfonic acid groups (FIG. 3b). It is expected that there would be more sites on SB-1 with neighboring oxine ligands based on the higher ligand loading for this composite relative to CB-1 and WP-4 (0.90 versus 0.54 mmol/g). Thus in the case of SB-1 the anionic sulfonyl group interferes with ligand binding rather than enhancing the rate of adsorption as has been previously reported for sulfonic acid groups on polystyrene resins with phosphonic based co-ligands (Alexandratos et al., "Intraligand Cooperation in Metal-Ion Binding by Immobilized Ligands: The Effect of Bifunctionality," *J. Appl. Poly. Sci.* 91:463 (2004)).

The Langmuir sorption model determines the relationship between the concentrations of surface adsorbed species to the number of active sites on that surface at equilibrium. If an adsorption process follows this model then it can be concluded that adsorption takes place as a monolayer on a homogeneous surface without interactions between the adsorbed species. The rearranged linear version of the Langmuir equation is shown in Equation 2.

$$C_e/Q_e = C_e/Q_m + 1/Q_m K_{ads} \quad (2)$$

where $C_e$ represents the concentration of metal ions in solution at equilibrium (mg/L), $Q_e$ is the concentration of metal ions adsorbed onto the composite (mg/L), $Q_m$ is the measure of the maximum capacity of the adsorbent (mg/g) and $K_{ads}$ is the intensity of adsorption (L/g).

$Q_m$ can be calculated from the slope of the straight line plot of $C_e/Q_e$ vs $C_e$. The constant $K_{ads}$ can be derived from the slope and the intercept of the same straight line ($1/Q_m K_{ads}$). If the plot of eq 2 is linear then $Q_m$ provides an estimate of the active sites and $K_{ads}$ gives an estimate of the driving force or the equilibrium constant for the process.

Figure 4:
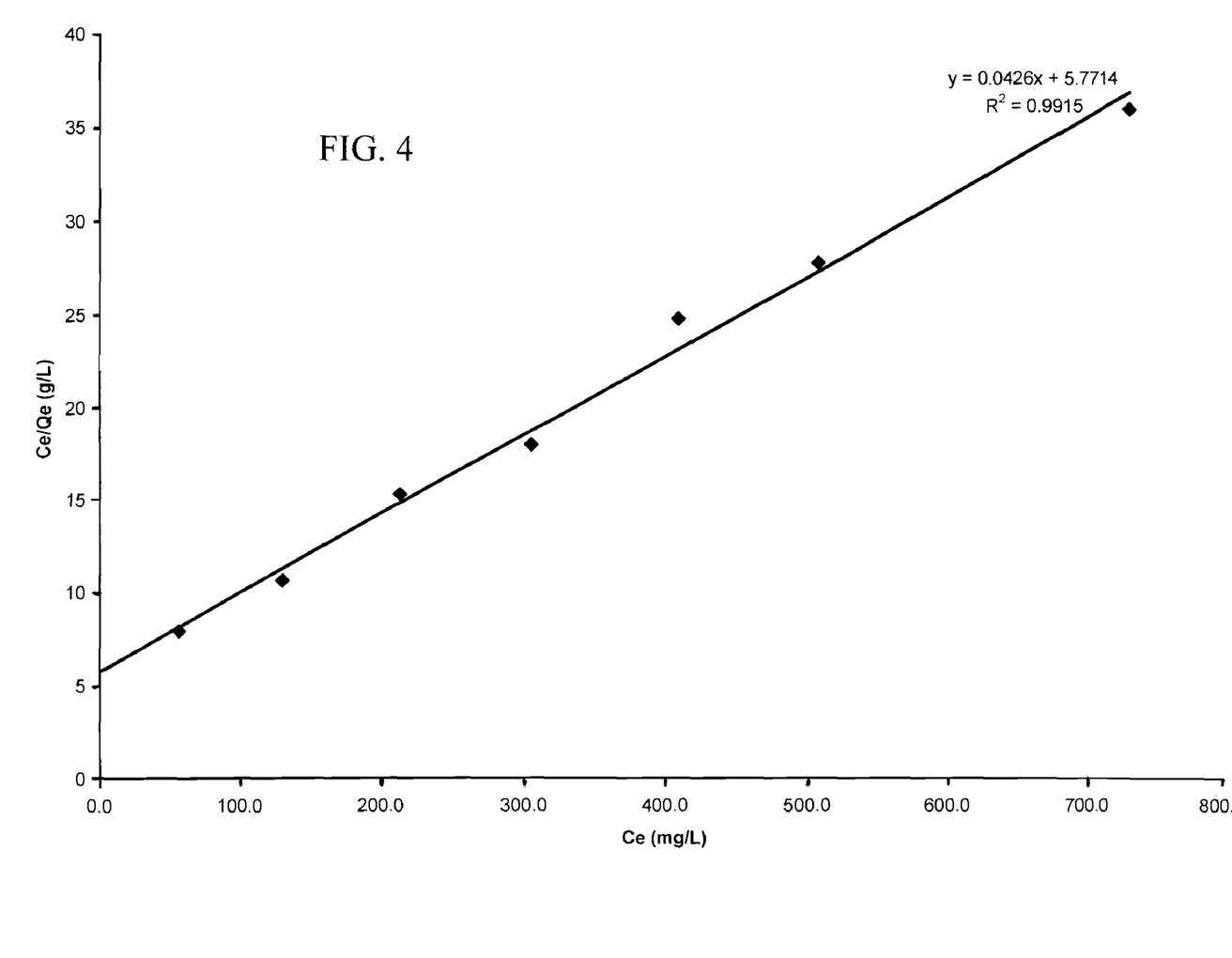
FIG. 4 shows a mass transfer kinetics graph of WP-4, CB-1 and SB-1: (a) t=0 to 200 min and (b) t=0 to 20 min.

Langmuir concentration dependent isotherm for ferric iron on WP-4 at pH 2 is reported in FIG. 4. The Langmuir model fits the sorption of ferric iron by WP-4 very well, $R^2=0.9915$. In addition, the model provides information regarding the intensity of the sorption process ($K_{ads}$) as well as an approximation of the theoretical number of sorption sites on the surface ($Q_m$). The value of $K_{ads}$ for WP-4 is 0.007 L/g and the value of $Q_n$ is 24 mg/g at pH 2. The values of $K_{ads}$ and $Q_n$, values reported here are similar to the values obtained for cation binding by similar silica polyamine composites ($K_{ads}$=0.012 L/g and $Q_m$=21-44 mg/g for $Ni^{2+}$ cations with an EDTA ligand on silica polyamine composite; Kailasam et al., *Ind. Eng. Chem. Res.* 48:3991 (2009)).

EXAMPLE 4

Kinetic Study

Kinetics studies were performed on the composites: WP-4, SB-1 and CB-1. 0.1 g of each composite was added to 3 separate vials. 10 mL of a 1.5 g/L Iron (III) solution at pH 2 was then added to each vial. The tests were performed for a 24 hr period and the samples were removed from the shaker at 10, 20, 30, 60 min and 2, 4, 6, 12, 24 hr. Upon removal from the shaker, a small aliquot (20 μL) of the solution was extracted and diluted in a solution mixture of 2%/2%-$HNO_3$/KCl. Fe(III) concentration at each time interval was determined with FAA/AES and plotted over time.

Figure 5A:
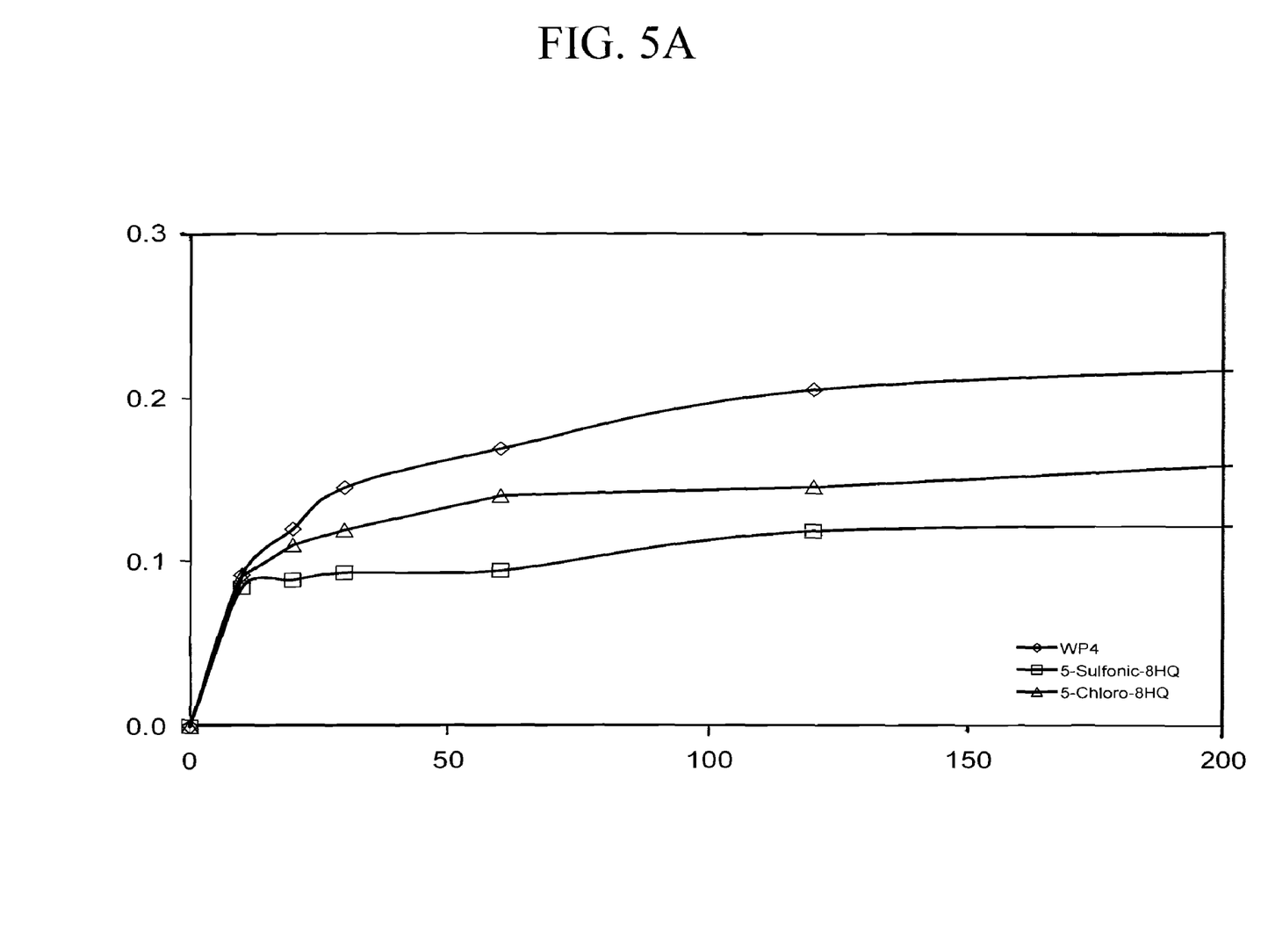
FIG. 5 shows a Fe(III) Langmuir plot for WP-4 at pH 2.
Figure 5B:
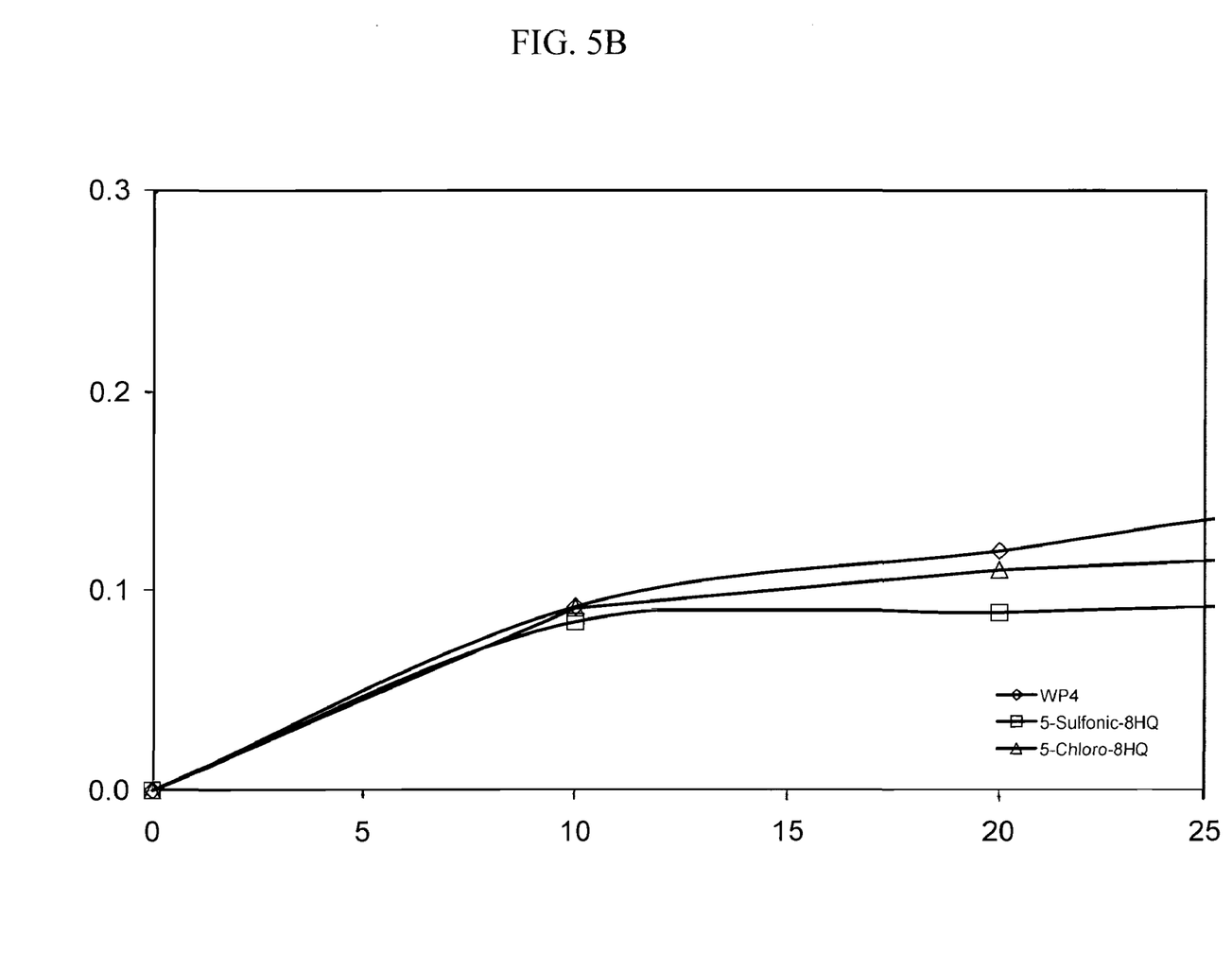

In an attempt to gain a better understanding of the impact of the substituent groups on the kinetics of adsorption in SB-1 and CB-1 versus WP-1 their adsorption of Fe (III) was monitored with time. The adsorption profiles of reveal that maximum loading of all three composites is reached within 2 h (FIG. 5a). Within first 25 min of the SB-1 and CB-1 showed a slightly faster rate of adsorption of Fe (III) ions than WP-4 (FIG. 5b). Thus the substitution of sulfonate or chloride has little influence on the rate of adsorption even though the mode of binding of the metal ions in SB-1 is quite different than the other two composites. Overall, the time to reach full loading of metal ion for these composites is very similar to that observed for composites containing more lipophilic modifying ligands (Hughes et al., "Characterization and Applications of Poly-Acetate Modified Silica Polyamine Composites," *Sep. Sci. Tech.* 42:261 (2007)). This demonstrates that even with the rather large hydrophobic oxine ligands on the surface of the composite the rapid mass transfer kinetics associated with these materials is not significantly affected.

EXAMPLE 5

Column Breakthrough Testing

Iron (III) and Nickel (II) breakthrough experiment and subsequent stripping were carried out by packing a 5 cc column with WP-4 (~2.5 g). A fit was attached at both ends of the column and challenge solutions were run through the column using a variable flow pump. The flow rate was held constant at 0.5 column volume/min. The column was conditioned as follows: 10 mL water, 15 mL pH 1.5 water adjusted with $H_2SO_4$. 100 mL of challenge solution (1.25 g/L of Fe and 0.4 g/L of Ni at pH 1.5) was ran through the column. The same column was rinsed with 10 mL pH 1.5 water, eluted with 25 mL 2M $H_2SO_4$ and finally rinsed with 10 mL of water. The rinse water used in all the above cases was deionized water. Eluent fractions were collected in 10 mL aliquots beginning with the first 10 mL of challenge solutions. The fractions were preserved with $HNO_3$ (conc.) and analyzed by FAA and/or ICP/AES.

The breakthrough capacity (BC, the total mole quantity of metal ion adsorbed by each gram of composite under flow conditions) was calculated using equation 1.

$$BC=[(C_o V_F)-(C_f V_{FR})]/m_c \quad (1)$$

where $C_o$ (mM) represents the initial metal ion concentration of the feed solution, and $V_F$(L) is the volume of metal ion feed solution fed through the column. $C_f$ (mM) is the total metal ion concentration in the eluent which includes the eluent from the treated metal ion feed solution and the subsequent water rinse. $V_{FR}$ (L) is the volume of the feed and rinse solutions combined. $m_c$ (g) is the mass of silica polyamine composite packed into the column. $V_c$, the volume of the SPC in the column (mL), can be substituted for $m_c$ in equation 1 to obtain a value for BC in the units of mmol/mL.

Figure 6:
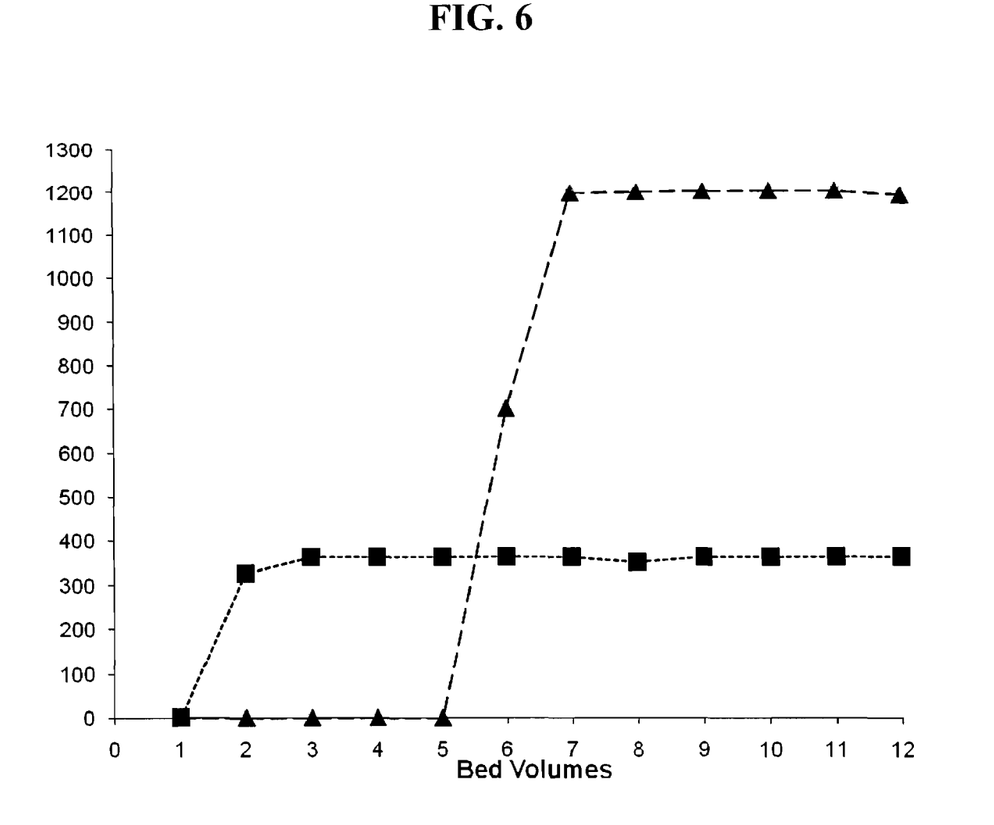
FIG. 6 shows Ni(II) and Fe(III) breakthrough for WP-4.

In general, column studies provide a better description of how a material will perform in an actual application relative to batch experiments. Given the excellent selectivity for iron over nickel observed with WP-4 a dynamic separation of nickel from iron was attempted. The breakthrough profile of WP-4 is shown in FIG. 6 was done on an aqueous solution containing 1.25 g/L of Fe (III) and 0.4 g/L of Ni (II) at pH 1.5 using a 5 cc column containing 2.5 g of WP-4. At a rate of 0.5 column volumes per minute. The breakthrough graph illustrates the selective removal of iron from nickel. Fe (III) was observed after 5 bed volumes but Ni (II) was detected in the effluent almost instantly. Fe (III) effluent concentration reached the feed concentration after 8 bed volumes. Using equation 1, breakthrough capacity for WP-4 was calculated to be 11 mg/g or 0.20 mmol/g. Iron can be removed and the material regenerated by the use of 2 M sulfuric acid. The resulting solutions were 99.9% pure with respect to iron. This represents an excellent way to separate nickel and ferric ion and should have practical applications in the specialty steel industry for recovery of nickel from pickling solutions and in certain ore leach hydrometallurgical circuits.

EXAMPLE 7

Recovery of Gallium from Zinc Mine Tailings

Given the selectivity of WP-4 for gallium over aluminum observed in the batch data presented above it would be useful to test a real multicomponent metal solution containing gallium. Gallium batch capacities at pH=2.3 were 22.47±0.13, 24.50±0.24 and 26.07±0.17. WP-4 was used because of the higher selectivity factor observed for this SPC. A sample of solid ore tailings from a zinc mine in Gordensville, Tenn. was received from Pasminco Zinc, an Australian mining company which has a zinc mine located in Gordonsville, Tenn. This waste product was found to contain large amounts of iron, zinc, gallium, and a small amount of germanium. Since both gallium and germanium are quite valuable, removal and concentration of both metals using the silica gel polyamine technology seemed worth pursuing. The first step was to dissolve the metals into solution using a nitrogen catalyzed pressure leach (Anderson et al., "The Application of Sodium Nitrite Oxidation and Fine Grinding in Refractory Precious Metals Concentrate Pressure Leaching," Transactions of the Society for Mining, Metallurgy, and Exploration 299:61 (1996)). The total reaction for the dissolution of metals into solution can be summarized by the following reactions:

$$2Ga_2S_3+12H^++3O_2 \rightarrow 4Ga^{+3}+6S^\circ+6H_2O \quad (6.1)$$

$$2FeS+4H^++O_2 \rightarrow 2Fe^{+2}+2S^\circ+6H_2O \quad (6.2)$$

$$2ZnS+4H^++O_2 \rightarrow 2Zn^{+2}+2S^\circ+6H_2O \quad (6.3)$$

$$2GeS+4H^++O_2 \rightarrow 2Ge^{+2}+2S^\circ+6H_2O \quad (6.4)$$

After leaching the metals into solution, zinc powder was added prior to running the breakthrough test to ensure that all the iron present was in the ferrous form because ferric ion is known to bind to WP-4.

TABLE 5

Metal Profile of Pasminco Challenge Solution.

| Element | Concentration (mg/L) |
| --- | --- |
| Aluminum | 1,944 |
| Gallium | 2,191 |
| Germanium | 200 |
| Iron (as ferrous) | 36,980 |
| Zinc | 5,381 |

Figure 7:
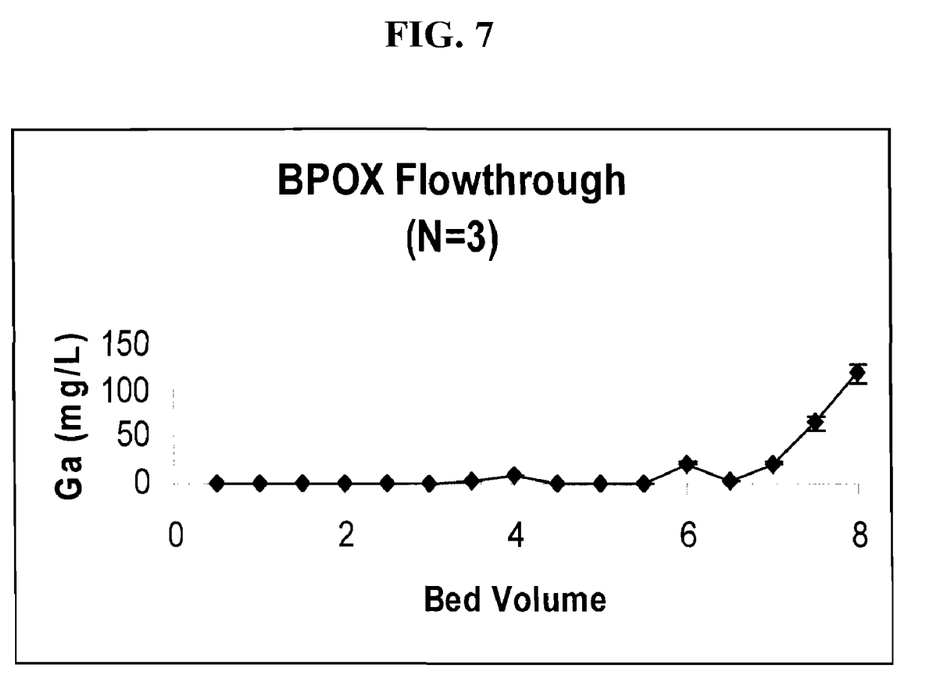
FIG. 7 shows a gallium break through curve for the separation of gallium from the zinc mine waste solution at pH=2.1 with WP-4.
Figure 8:
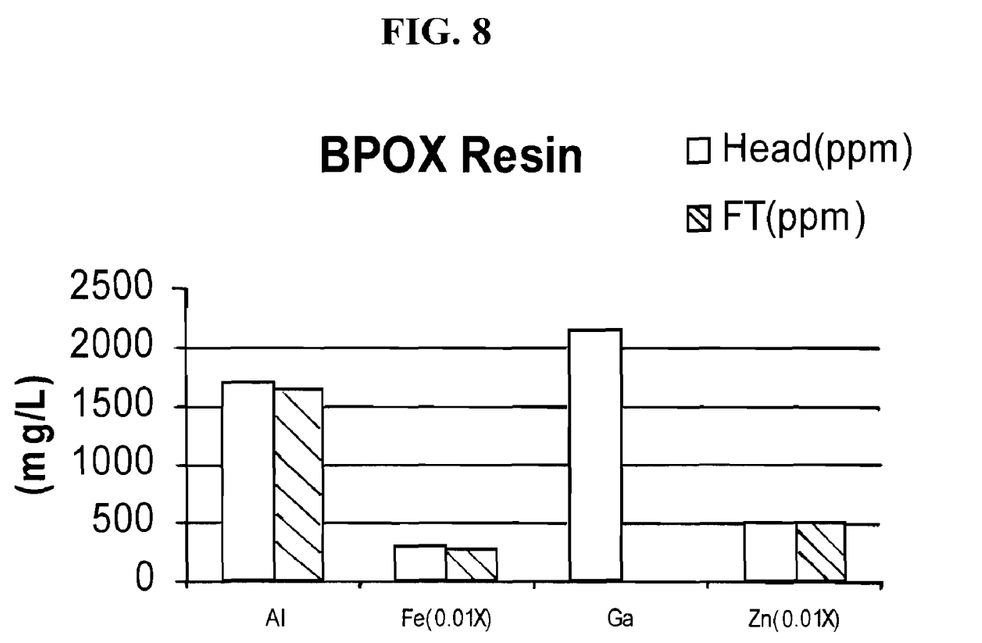
FIG. 8 is a bar graph of flow through versus feed for gallium recovery form zinc mine waste solution using WP-4.
Figure 9:
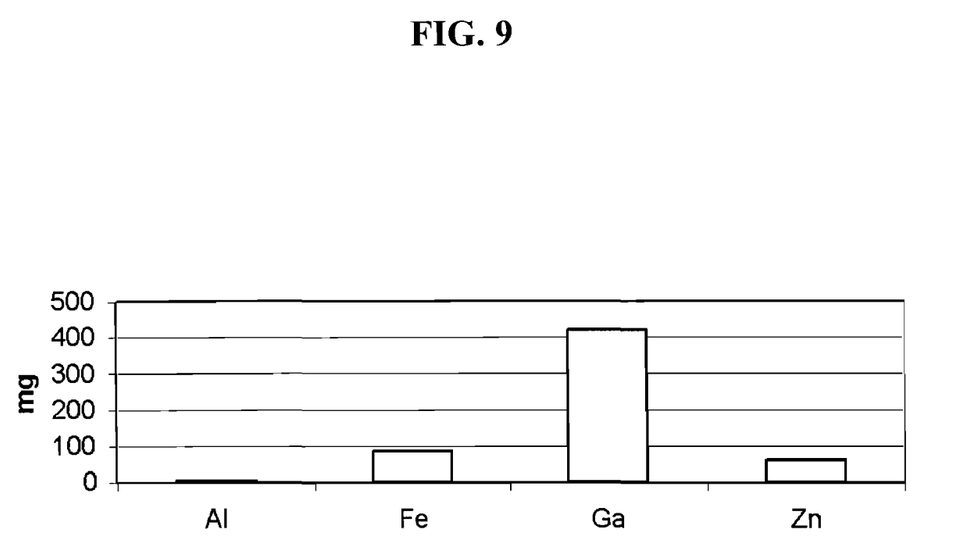
FIG. 9 shows the strip composition for gallium recovery form zinc mine waste solution using WP-4.

The testing of WP-4 was carried out in a 25 mL syringe column containing 18.6 grams of WP-4 at a flow rate of 0.2 column volumes per minute. The columns were stripped and collected using 25 mL of 4M sulfuric acid. The solutions contained germanium and gallium as well as zinc, aluminum and iron (Table 5). The pH of the solution was adjusted to 2.1 as this proved to be the optimal pH for gallium recovery. Gallium breakthrough for WP-4 does not occur until seven bed volumes (FIG. 7). WP-4 was very selective for gallium removal from aluminum, iron, and zinc. The silica gel composite passed the other metals while retaining all the gallium (FIG. 8). There was some co-loading of ferrous and zinc as seen from the strip of the column after breakthrough (FIG. 9) but considering the large excesses of these metals selectivity can be considered good. Most importantly, the selectivity for gallium over aluminum is very good and the strip solution could be directly electrolyzed to give a ball of pure gallium as the only reduced species (Anderson, personal communication). The strip contained 410 mg of gallium in the 25 mL strip or 16.4 g/L. this constitutes a concentration factor of 7.5 and a gallium capacity of 22 mg/g of gallium. The metal selectivity ratios relative to the three other metals present in the solution for WP-4 are given in Table 6. Thus, it would appear that WP-4 could provide an effective material for recovering gallium from acidic zinc tailings solutions containing significant amounts of gallium. The strip or the flow through was not analyzed for the small amount of germanium in the feed solution. Subsequent studies with WP-4 showed that the germanium does co-load with the gallium and that this composite showed some selectivity for germanium (Miranda et al., "Gallium and Arsenic/Selenium Recoveries from Aqueous Systems Using Silica Based Chelating Composites," Univ. of Montana Dissertation, Pub. No. 3184233 (2005)). It is possible that with further column engineering that this selectivity could be used to separate the two metals. Apparently the contamination of the gallium by germanium did not interfere with electrolysis of the gallium as mentioned above.

TABLE 6

Metal Selectivity Ratios for the WP-4 recovery of gallium from a waste ore leach.

| Gallium to Metal Ratio | Ratio |
| --- | --- |
| Aluminum | 92.41 |
| Iron | 4.87 |
| Zinc | 6.81 |

All Embodiments

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A metal sequestration compound comprising a silica polyamine composite covalently bound to 5-chloro-8-hydroxyquinoline or 5-sulfonyl-8-hydroxyquinoline.

2. The metal sequestration compound of claim 1, wherein said silica polyamine composite comprises a silica gel in combination with a polyamine selected from the group consisting of polyallylamine, polyvinylamine, and polyethylene-imine.

3. The metal sequestration compound of claim 2, wherein said polyamine is polyallylamine.

4. A method of manufacturing a metal sequestration compound comprising the steps of:
   treating a silica gel with acid washing, humidification, and silanization with a mixture of methyltrichlorosilane and chloropropyltrichlorosilane;
   contacting said silica gel with a polyamine to yield a silica polyamine composite; and
   joining said silica polyamine composite with 5-chloro-8-hydroxyquinoline or 5-sulfonyl-8-hydroxyquinoline.

5. The method of claim 4, wherein said polyamine is selected from the group consisting of polyallylamine, polyvinylamine, and polyethylene-imine.

6. The method of claim 5, wherein said polyamine is polyallylamine.

7. The method of claim 4, wherein said joining comprises the Mannich reaction.

8. The method of claim 4, wherein said silica polyamine composite is joined to said 5-chloro-8-hydroxyquinoline or 5-sulfoxyl-8-hydroxyquinoline by a covalent bond.

9. A method of sequestering a metal from an aqueous solution comprising the steps of:
   contacting an aqueous solution comprising at least one metal with a metal sequestration compound comprising a silica polyamine composite covalently bound to 5-chloro-8-hydroxyquinoline or 5-sulfonyl-8-hydroxyquinoline; and
   recovering said metal sequestration compound from said aqueous solution.

10. The method of claim 9, wherein said silica polyamine composite comprises a silica gel in combination with a polyamine selected from the group consisting of polyallylamine, polyvinylamine, and polyethylene-imine.

11. The method of claim 9, wherein said aqueous solution comprises mine tailing leachate.

12. The method of claim 9, wherein said metal is selected from the group consisting of aluminum, arsenic, cadmium, chromium, cobalt, copper, gallium, germanium, iron, lead, manganese, magnesium, mercury, molybdenum, nickel, plutonium, selenium, thallium, thorium, tin, tungsten, uranium, vanadium, zinc, and zirconium.

13. A method of separating two distinct metals present in an aqueous solution comprising the steps of:
   contacting an aqueous solution comprising a first metal and a second metal with a metal sequestration compound comprising a silica polyamine composite covalently bound to 5-chloro-8-hydroxyquinoline or 5-sulfonyl-8-hydroxyquinoline; and
   recovering said metal sequestration compound from said aqueous solution,
   wherein said first metal and said second metal are not identical.

14. The method of claim 13, wherein said silica polyamine composite comprises a silica gel in combination with a polyamine selected from the group consisting of polyallylamine, polyvinylamine, and polyethylene-imine.

15. The method of claim 13, wherein said first and second metals are selected from the group consisting of aluminum, arsenic, cadmium, chromium, cobalt, copper, gallium, germanium, iron, lead, manganese, magnesium, mercury, molybdenum, nickel, plutonium, selenium, thallium, thorium, tin, tungsten, uranium, vanadium, zinc, and zirconium, and wherein said first metal is not identical to said second metal.

16. The method of claim 13, wherein said first metal is gallium and said second metal is aluminum.

17. The method of claim 13, wherein said first metal is iron and said second metal is nickel.

18. The method of claim 13, wherein said first metal is copper and said second metal is nickel.

* * * * *